United States Patent
Kajino et al.

(10) Patent No.: US 9,869,417 B2
(45) Date of Patent: Jan. 16, 2018

(54) PIPE COUPLING STRUCTURE

(71) Applicant: SHINFUJI KUUCHOU CO., LTD., Kounosu-shi, Saitama (JP)

(72) Inventors: Isamu Kajino, Kounosu (JP); Takaaki Uchikawa, Kashiwa (JP)

(73) Assignee: SHINFUJI KUUCHOU CO., LTD., Saitama (JP)

( * ) Notice: Subject to any disclaimer, the term of this patent is extended or adjusted under 35 U.S.C. 154(b) by 122 days.

(21) Appl. No.: 14/944,142

(22) Filed: Nov. 17, 2015

(65) Prior Publication Data

US 2017/0051861 A1 Feb. 23, 2017

(30) Foreign Application Priority Data

Aug. 18, 2015 (JP) .................. 2015-160831

(51) Int. Cl.
*F16L 37/26* (2006.01)

(52) U.S. Cl.
CPC .................... *F16L 37/26* (2013.01)

(58) Field of Classification Search
CPC .............................. F16L 37/26; F16L 37/107
USPC ........................................................ 285/424
See application file for complete search history.

(56) References Cited

U.S. PATENT DOCUMENTS

| | | | | |
|---|---|---|---|---|
| 528,816 A * | 11/1894 | Smiley | ............. | F16L 37/252 285/424 |
| 1,308,981 A * | 7/1919 | Buller | ............. | F16L 37/565 285/424 |
| 1,606,275 A * | 11/1926 | Vaughan | ............. | F16L 15/005 285/424 |
| 1,661,674 A * | 3/1928 | Osborn | ............. | F16L 37/084 285/424 |
| 2,179,193 A * | 11/1939 | Parrish | ............. | E21B 7/005 285/424 |
| 2,537,284 A * | 1/1951 | Schuder | ............. | E21B 17/08 285/424 |
| 2,650,114 A * | 8/1953 | Epstein | ............. | F16L 37/02 285/424 |
| 2,910,308 A * | 10/1959 | Carr | ............. | F16L 37/084 285/424 |
| 2,910,311 A * | 10/1959 | Carr | ............. | F16L 27/12 285/424 |
| 2,936,184 A * | 5/1960 | Epstein | ............. | F16L 9/02 285/424 |

(Continued)

*Primary Examiner* — David Bochna
(74) *Attorney, Agent, or Firm* — Arent Fox LLP (57) ABSTRACT

A pipe coupling structure is capable of coupling pipes together without driving a screw and using a tool. An example pipe coupling structure includes a first engagement portion formed in an end portion of a first air-conditioning duct. The first engagement portion extends in the circumferential directions and protrudes inside of the first air-conditioning duct. A second engagement portion is formed in an end portion of a second air-conditioning duct. The second engagement portion extends in the circumferential directions and protrudes outside of the second air-conditioning duct. When the end portion of the second air-conditioning duct is inserted into the end portion of the first air-conditioning duct, the second engagement portion climbs over the first engagement portion, and thereby the first engagement portion and the second engagement portion engage each other.

11 Claims, 4 Drawing Sheets

(56) References Cited

U.S. PATENT DOCUMENTS

| | | | | |
|---|---|---|---|---|
| 2,959,196 A | * | 11/1960 | Truesdell | F16L 9/18 285/424 |
| 2,978,261 A | * | 4/1961 | Epstein | F16L 9/18 285/424 |
| 3,065,002 A | * | 11/1962 | Waalkes | F16L 37/0985 285/424 |
| 3,066,959 A | * | 12/1962 | White | F16L 37/084 285/424 |
| 3,120,402 A | * | 2/1964 | Wallen | F16L 37/101 285/424 |
| 3,170,544 A | * | 2/1965 | Kinkead | F16L 59/188 285/424 |
| 3,233,927 A | * | 2/1966 | Dewhirst | F16L 9/18 285/424 |
| 5,125,198 A | * | 6/1992 | Giumenta | E04F 17/026 285/424 |
| 5,158,328 A | * | 10/1992 | Anderson | D06F 58/20 285/424 |
| 5,199,190 A | * | 4/1993 | Mayer | D06F 58/20 285/424 |
| 2007/0257487 A1 | * | 11/2007 | Jacklich | F16L 37/252 285/424 |

* cited by examiner

PIPE COUPLING STRUCTURE

CROSS-REFERENCE TO RELATED APPLICATION

This application is a based upon and claims priority from the prior Japanese Patent Application No. 2015-160831, filed Aug. 18, 2015. The disclosure of the priority application is incorporated in its entirety herein by reference.

TECHNICAL FIELD

The present invention relates to a pipe coupling structure for coupling pipes together, particularly a pipe coupling structure capable of coupling pipes together without a tool.

BACKGROUND ART

For example, in connecting two air-conditioning ducts, conventionally, an end part of a cylindrical bayonet joint (nipple) is inserted into an end part of the one duct, and the other end part of the bayonet joint is inserted into an end part of the other duct. Then, both insertion parts are subjected to screw driving or the like using an electric power tool. However, in this method, a bayonet joint is indispensable separately in addition to ducts, thereby increasing the cost of component parts. Further, screw driving or the like needs to be given to the two insertion parts, thereby taking time and cost for the work.

Therefore, a spiral pipe is known which has an end part smaller in outer diameter than the pipe itself, thereby dispensing with a bayonet joint (e.g., refer to Patent Document 1). This spiral pipe is formed by shrinking the outer diameter of an end part thereof, making a plurality of grooved concave portions in the shrunk part (the diameter-shrunk end part) and inserting the shrunk part into a spiral pipe to be connected thereto. Consequently, a bayonet joint becomes dispensable.

PRIOR ART DOCUMENTS

[Patent Document]
[Patent Document 1] Japanese Patent Laid-Open Publication No. 06-066394

SUMMARY OF THE INVENTION

Problems to be Solved by the Invention

However, in the art of Patent Document 1, screw driving is still necessary for the connection part, even though a bayonet joint is dispensable. This requires the use of an electric power tool in a high place, a shrink place or the like, and thereby, a worker may bear a heavy burden and be kept unsafe. Besides, screw driving may be difficult in a work environment, an object of work or the like, thereby making the essential screw driving impossible (leading the execution of works inappropriate).

In addition, in order to prevent air from leaking from a screw-driving part, the screw-driving part needs to undergo sealing, thereby taking labor and time. Further, screws may be corroded, thereby leading a duct or the like falling off.

Therefore, it is an object of the present invention to provide a pipe coupling structure capable of coupling pipes together without driving a screw and using a tool.

Means for Solving the Problem

In order to accomplish the object, a pipe coupling structure according to claim 1 includes: a first engagement portion formed in an end part of a first pipe, the first engagement portion extending in the circumferential directions of the first pipe and protruding inside of the first pipe; and a second engagement portion formed in an end part of a second pipe, the second engagement portion extending in the circumferential directions of the second pipe and protruding outside of the second pipe, and the end part of the second pipe being insertable into the end part of the first pipe, in which the end part of the second pipe is inserted into the end part of the first pipe, the second engagement portion climbs over the first engagement portion, and thereby, the first engagement portion and the second engagement portion engage each other.

In the pipe coupling structure of claim 1, the first engagement portion and the second engagement portion are coupled together by inserting the end part of the second pipe into the end part of the first pipe, leading the second engagement portion to climb over the first engagement portion and engaging the first engagement portion and the second engagement portion.

According to claim 2, in the pipe coupling structure of claim 1, the first engagement portion is shaped out of a metal plate forming the first pipe and the second engagement portion is shaped out of a metal plate forming the second pipe.

According to claim 3, in the pipe coupling structure of claim 1 or 2, the first engagement portion has a protrusion becoming higher from the opening end side toward the other end side of the first pipe, and the second engagement portion has a protrusion becoming higher from the opening end side toward the other end side of the second pipe.

According to claim 4, in the pipe coupling structure of claims 1 to 3, the second pipe is formed with a contact portion coming into contact with the opening end of the first pipe when the first engagement portion and the second engagement portion engage each other.

According to claim 5, in the pipe coupling structure of claims 1 to 4, the end part of the second pipe has an outer diameter smaller than the second pipe and is formed with a plurality of grooved concave portions running in the axial directions of the second pipe, and the second engagement portion is arranged between the grooved concave portions.

Advantages of the Invention

In the pipe coupling structure of claim 1, the end part of the second pipe is simply inserted into the end part of the first pipe, and thereby, the first engagement portion engages with the second engagement portion. Consequently, the first engagement portion can be coupled to the second engagement portion without driving a screw and using a tool. This lightens the burden on a worker, improves the safety of the worker and ensures appropriate execution of works.

Furthermore, screw driving is dispensable and hence sealing is also unnecessary, thereby reducing the labor and time. Besides, without corrosion of a screw, a pipe can be prevented from falling off, thereby maintaining the appropriate pipe coupling.

In the pipe coupling structure of claim 2, the first engagement portion and the second engagement portion are shaped out of a metal plate forming the first pipe and the second pipe respectively. In short, each engagement portion unites with the corresponding pipe, thereby simplifying the configuration and reducing the manufacturing cost. Further, the engagement portions become stronger and stouter, thereby strengthening the pipe coupling.

In the pipe coupling structure of claim 3, the first engagement portion and the second engagement portion have a protrusion becoming higher from the opening end side (insertion side) toward the other end side (inside) of the pipe respectively. Therefore, the second pipe is smoothly inserted into the first pipe, and the first engagement portion easily engages with the second engagement portion. Besides, they will not easily disengage from each other. In short, the first pipe and the second pipe can be easily and strongly coupled together.

In the pipe coupling structure of claim 4, when the first engagement portions engage with the second engagement portions, the opening end of the first pipe comes into contact with the contact portion of the second pipe. Hence, the end part of the first pipe is sandwiched between the second engagement portions and the contact portion of the second pipe, thereby strongly coupling the first pipe and the second pipe.

In the pipe coupling structure of claim 5, the second pipe is an end-part diameter-shrunk pipe an end part of which has an outer diameter smaller than the second pipe and which is formed with a plurality of grooved concave portions. However, the second engagement portion is arranged between the grooved concave portions, thereby dispensing with screw driving and use of a tool.

MODE FOR IMPLEMENTING THE INVENTION

Embodiments of the present invention will be below described with reference to the drawings.

First Embodiment

Figure 1:
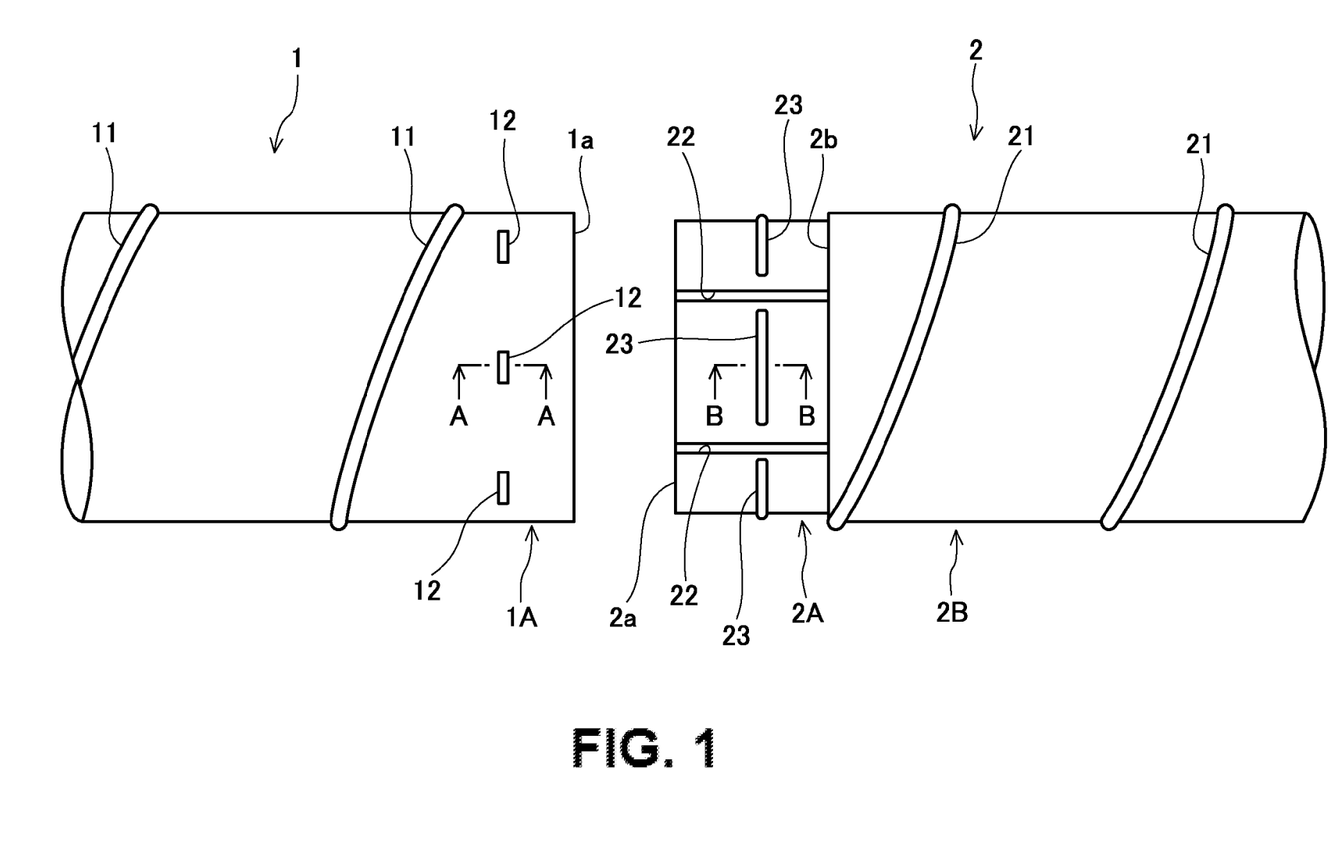
FIG. 1 is a front view showing a pipe coupling structure before pipes are coupled according to a first embodiment of the present invention.
Figure 2:
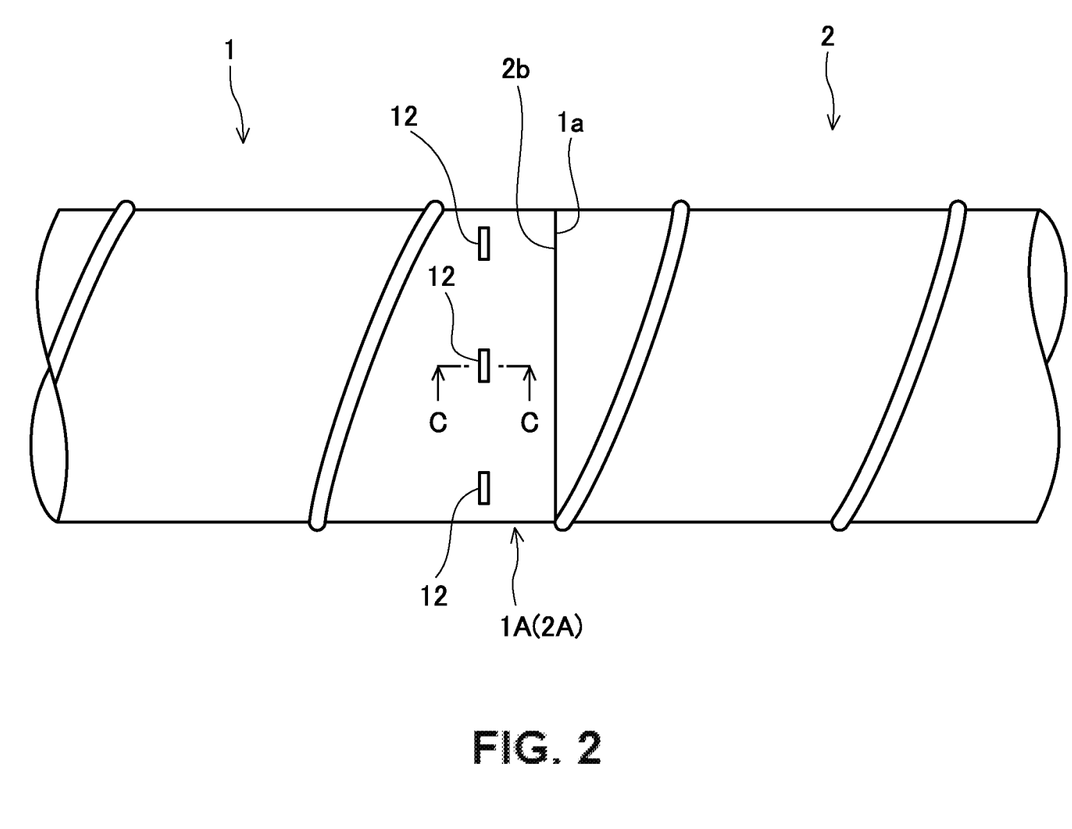
FIG. 2 is a front view showing the pipe coupling structure after the pipes have been coupled according to the first embodiment.

FIG. 1 is a front view showing a pipe coupling structure before pipes are coupled according to a first embodiment of the present invention and FIG. 2 is a front view showing the pipe coupling structure after the pipes have been coupled according to the first embodiment. The pipe coupling structure is a structure for coupling pipes together, and in this embodiment, a description will be given about coupling ducts 1 and 2 which have a cylindrical pipe shape and are used for air-conditioning.

The first air-conditioning duct (first pipe) 1 is a cylindrical spiral pipe formed by spirally winding a belt-like metal plate (belt material) and is a straight pipe. In the figure, reference numeral 11 denotes a convex seam portion formed for joining the edges of the belt material in forming the spiral pipe.

The first air-conditioning duct 1 is formed with a plurality of first engagement portions 12 interspersed in a one-end portion 1A thereof. The first engagement portions 12 extend in the circumferential directions (in the skew and vertical directions with respect to the axis) of the first air-conditioning duct 1 and protrude toward the inside thereof. The first engagement portions 12 are shaped (worked as one body) out of the metal plate forming the first air-conditioning duct 1. The first engagement portion 12 has a substantially quadrilateral shape in plan view and convexly extends inward, and the protrusion thereof becomes higher from the side of an opening end 1a (the edge of the one-end portion 1A) toward the other end side (the opposite side to the opening end 1a) of the first air-conditioning duct 1.

Figure 3A:
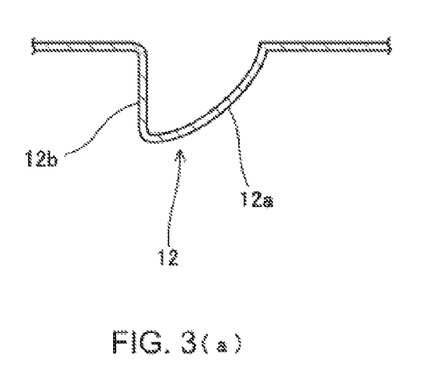
FIG. 3(a) is an A-A sectional view of FIG. 1

Specifically, as shown in FIG. 3(a), the first engagement portion 12 has no communicating/penetrating opening to the inside of the first air-conditioning duct 1 and has a lead-in portion 12a and a vertical portion 12b. The lead-in portion 12a protrudes obliquely and slightly curvedly (like the dorsal fin of a shark) from the side of the opening end 1a (insertion side) toward the other end side (inside). The vertical portion 12b extends substantially vertically (substantially vertically to the axis of the first air-conditioning duct 1) from the other side of the lead-in portion 12a. The lead-in portion 12a and the vertical portion 12b are designed to have a shape and a depth suitable for inserting a second air-conditioning duct 2 described later therein and for securely and strongly engaging the first engagement portion 12 and a second engagement portion 23 described later.

The length in the circumferential directions, the arrangement position and the number of the first engagement portions 12 are designed so that the first engagement portions 12 engage more securely with the second engagement portions 23 described later, obtain a specified coupling strength therewith and are easily formed/worked. For example, the width is set to approximately 1-1.5 mm, the length in the circumferential directions approximately 4 mm and the arrangement pitch (interval) approximately 50-60 mm. Besides, the first engagement portion 12 is designed to have a size, as described later, suitable for working the first engagement portion 12 by a tool like cutting pliers.

The second air-conditioning duct (second pipe) 2 is a cylindrical spiral pipe formed by spirally winding a belt-like metal plate (belt material) and is a straight pipe. A primary pipe portion 2B except a one-end portion 2A thereof has an outer diameter equal to that of the first air-conditioning duct 1. In the figure, reference numeral 21 denotes a convex seam portion formed for joining the edges of the belt material in forming the spiral pipe. The second air-conditioning duct 2 is an end-part diameter-shrunk pipe which has the one-end portion (diameter-shrunk end portion) 2A having a shrink outer diameter. The one-end portion 2A is formed with a plurality of grooved concave portions 22 extending in the axial directions.

The one-end portion 2A has an outer diameter slightly smaller than the inner diameter of the first air-conditioning duct 1 so that the one-end portion 2A can be inserted (fitted) into the one-end portion 1A of the first air-conditioning duct 1. The shape/size and the number (four in this embodiment) of the grooved concave portions 22 are designed so that the outer diameter of the second air-conditioning duct 2 is shrunk to form the one-end portion 2A without deformation, wrinkles or the like.

The one-end portion 2A is formed with the second engagement portions 23 which extend in the circumferential directions (in the skew and vertical directions with respect to the axis) and protrude toward the outside thereof and each of which are arranged between the grooved concave portions 22. The second engagement portions 23 are shaped (worked as one body) out of the metal plate forming the second air-conditioning duct 2. The first engagement portion 12 has a long and substantially quadrilateral shape (cordlike rib) in plan view and protrudes outward in a convex shape, and the protrusion thereof becomes higher from the side of an opening end $2a$ (the edge of the one-end portion 2A) toward the other end side (the opposite side to the opening end $2a$) of the second air-conditioning duct 2.

Figure 3B:
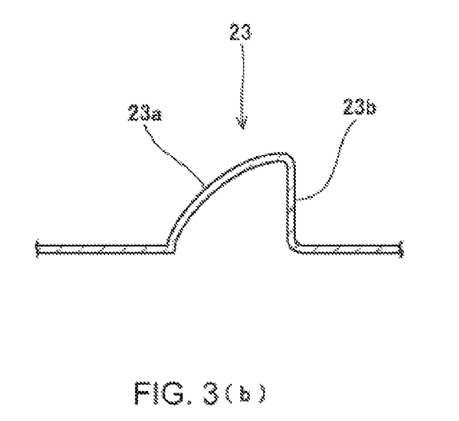
FIG. 3(b) is a B-B sectional view of FIG. 1.

Specifically, as shown in FIG. 3($b$), the second engagement portion 23 has no communicating/penetrating opening to the inside of the second air-conditioning duct 2 and has a lead-in portion 23$a$ and a vertical portion 23$b$. The lead-in portion 23$a$ protrudes obliquely and slightly curvedly (like the dorsal fin of a shark) from the side of the opening end $2a$ (insertion side) toward the other end side (inside). The vertical portion 23$b$ extends substantially vertically (substantially vertically to the axis of the second air-conditioning duct 2) from the other side of the lead-in portion 23$a$. The lead-in portion 23$a$ and the vertical portion 23$b$ are designed to have a shape and a height suitable for inserting the second air-conditioning duct 2 into the first air-conditioning duct 1 and for securely and strongly engaging the first engagement portion 12 and the second engagement portion 23.

The second engagement portion 23 stretches over between the adjoining grooved concave portions 22 and is long enough to engage more securely with the first engagement portion 12. The second engagement portion 23 is formed simultaneously by a die for shrinking the outer diameter of the one-end portion 2A and forming/shaping the grooved concave portions 22.

Figure 4:
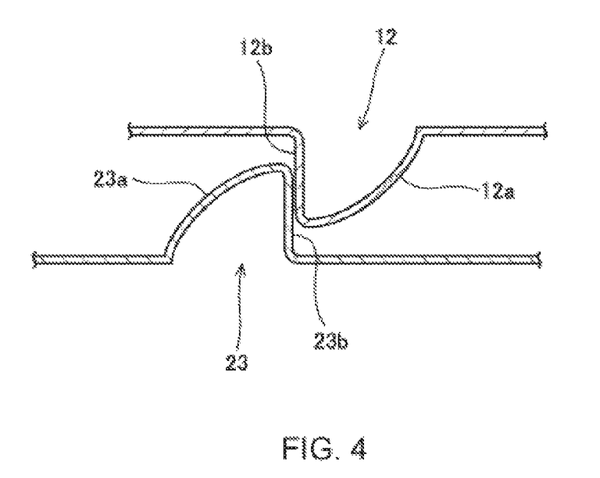
FIG. 4 is a C-C sectional view of FIG. 2.

The one-end portion 2A of the second air-conditioning duct 2 is inserted into the one-end portion 1A of the first air-conditioning duct 1. Then, the second engagement portion 23 climbs over the first engagement portion 12, and thereby, as shown in FIG. 4, the first engagement portion 12 engages with the second engagement portion 23. Specifically, the air-conditioning ducts 1 and 2 are fitted and thrust, and thereby, the lead-in portion 12$a$ of the first engagement portion 12 comes into contact with the lead-in portion 23$a$ of the second engagement portion 23. Then, both advance in the axial directions with kept in contact, and thereby, the first air-conditioning duct 1 is pressed in the diameter-expanding directions while the second air-conditioning duct 2 is pressed in the diameter-shrinking directions. When the lead-in portion 12$a$ and 23$a$ have passed through each other, the pressing is released (the diameter of the air-conditioning duct 1, 2 returns to the diameter before pressed), and thereby, the vertical portion 12$b$ and 23$b$ come into contact with/engage each other.

The second air-conditioning duct 2 is formed with a contact portion 2$b$ coming into contact with the opening end 1$a$ of the first air-conditioning duct 1 when the first engagement portion 12 engages with the second engagement portion 23. Specifically, the contact portion 2$b$ corresponds to the boundary part/stepped part between the one-end portion 2A having a shrunk outer diameter and the primary pipe portion (non-diameter-shrunk portion) 2B. The air-conditioning ducts 1 and 2 are fitted and thrust, and the engagement portions 12 and 23 engage each other. At this time, as shown in FIG. 2, the opening end 1$a$ of the first air-conditioning duct 1 comes into contact with the contact portion 2$b$. Consequently, the one-end portion 1A (ranging from the first engagement portion 12 up to the opening end 1$a$) of the first air-conditioning duct 1 is sandwiched between the second engagement portion 23 and the contact portion 2$b$. In other words, the position of the engagement portion 12, 23 and the position, height and the like of the contact portion 2$b$ are designed so that the one-end portion 1A is held between them.

In the thus-configured pipe coupling structure, in order to couple/connect the first air-conditioning duct 1 and the second air-conditioning duct 2, the one-end portion 2A of the second air-conditioning duct 2 is thrust into the one-end portion 1A of the first air-conditioning duct 1, and as described above, the first engagement portion 12 engages with the second engagement portion 23. As a result, the opening end 1$a$ of the first air-conditioning duct 1 comes into contact with the contact portion 2$b$, and as shown in FIG. 2, the two air-conditioning ducts 1 and 2 are coupled together without a gap and a step. Then, sealing (an airtight process) is conducted in between the opening end 1$a$ of the first air-conditioning duct 1 and the contact portion 2$b$.

In an execution site of works, in order to adjust the length of the coupled air-conditioning ducts 1 and 2, before they are coupled together, a desired part on the opening end 1$a$ side of the first air-conditioning duct 1 is cut off to set the first air-conditioning duct 1 to a desired length. Next, in the positions a predetermined distance apart from the opening end 1$a$ of the first air-conditioning duct 1, using a tool like cutting pliers, the first air-conditioning duct 1 is worked to form a predetermined number of the first engagement portions 12.

As described above, in the pipe coupling structure, the one-end portion 2A of the second air-conditioning duct 2 is simply inserted into the one-end portion 1A of the first air-conditioning duct 1, and thereby, the first engagement portion 12 engages with the second engagement portion 23. Consequently, the two air-conditioning ducts 1 and 2 are coupled together without driving a screw and using a tool. This lightens the burden on a worker, improves the safety of the worker and ensures appropriate execution of works. Conventionally, screw driving might not have conducted in a shrink place or the like where screw driving is difficult. However, the pipe coupling structure clears up the trouble, thereby ensuring appropriate execution of works.

Furthermore, screw driving is dispensable and hence sealing is also unnecessary around a screw, thereby reducing the labor and time. Besides, without corrosion of a screw, the air-conditioning ducts 1 and 2 can be prevented from falling off, thereby maintaining the appropriate pipe coupling.

In addition, the first engagement portion 12 and the second engagement portion 23 are shaped out of a metal plate forming the air-conditioning ducts 1 and 2 respectively. In short, each engagement portion 12, 23 unites with the corresponding air-conditioning duct 1, 2, thereby simplifying the configuration and reducing the manufacturing cost. Further, the engagement portions 12 and 23 become stronger and stouter, thereby strengthening the pipe coupling.

Furthermore, the first engagement portion 12 and the second engagement portion 23 have a protrusion becoming higher from the opening end 1$a$, 2$a$ side (insertion side) toward the other end side (inside) of the air-conditioning duct 1, 2 respectively. Therefore, the second air-conditioning duct 2 is smoothly inserted into the first air-conditioning duct 1, and the first engagement portion 12 easily engages with the second engagement portion 23. Besides, they will not easily disengage from each other (the air-conditioning duct 1, 2 is hard to draw from each other). In short, the first air-conditioning duct 1 and the second air-conditioning duct 2 can be easily/smoothly and strongly coupled together.

Moreover, when the first engagement portions 12 engage with the second engagement portions 23, the opening end 1$a$ of the first air-conditioning duct 1 comes into contact with the contact portion 2$b$ of the second air-conditioning duct 2. Hence, the one-end portion 1A of the first air-conditioning duct 1 is sandwiched between the second engagement portions 23 and the contact portion 2b of the second air-conditioning duct 2. Therefore, the first air-conditioning duct 1 and the second air-conditioning duct 2 couple strongly (without disengaging from each other) and without slipping out of place.

In addition, the second air-conditioning duct 2 is an end-part diameter-shrunk pipe the one-end portion 2A of which has an outer diameter smaller than the second air-conditioning duct 2 and which is formed with the plurality of grooved concave portions 22. However, the second engagement portion 23 is arranged between the grooved concave portions 22, thereby dispensing with screw driving and use of a tool.

Second Embodiment

Figure 5:
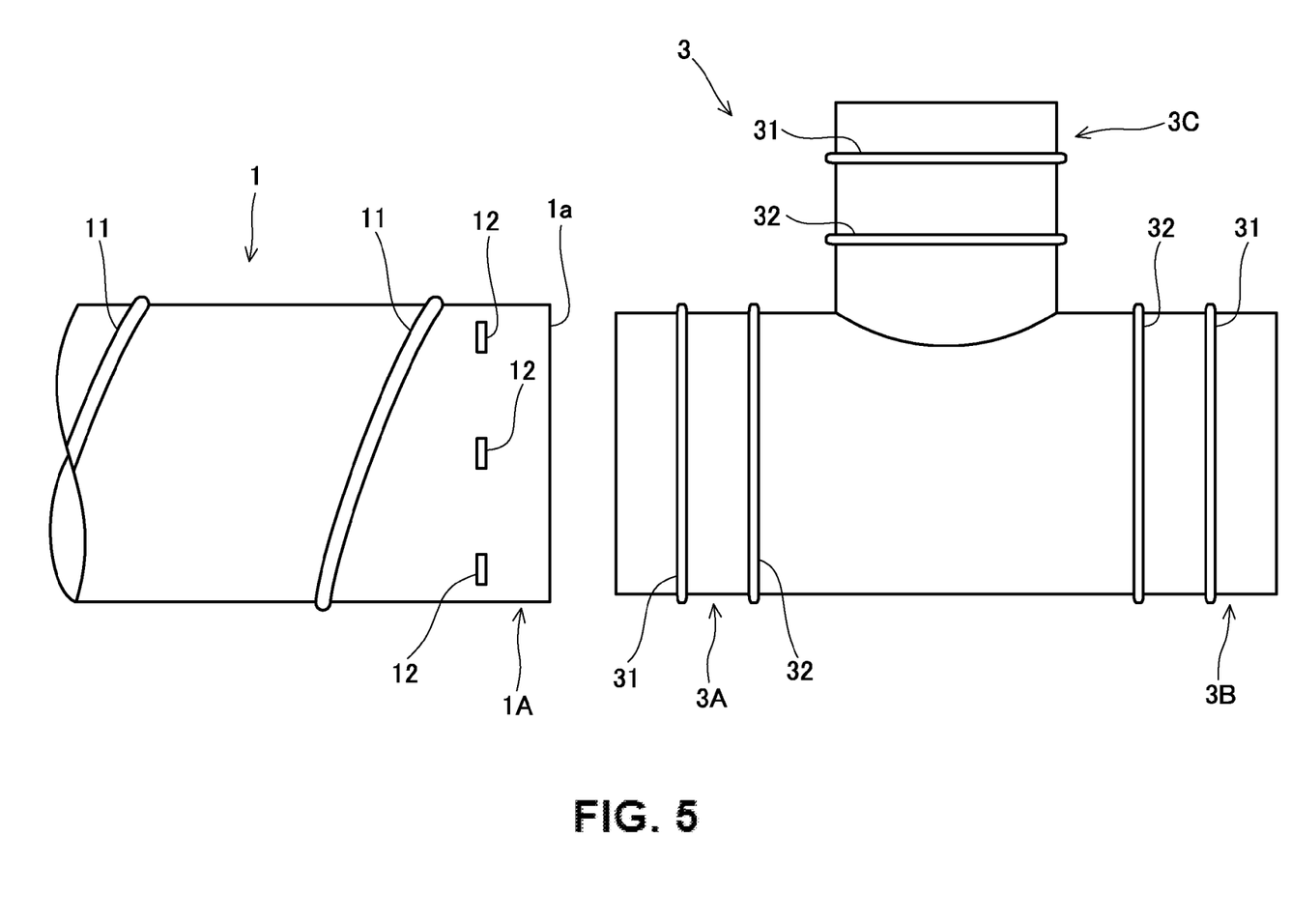
FIG. 5 is a front view showing a pipe coupling structure before pipes are coupled according to a second embodiment of the present invention.

FIG. 5 is a front view showing a pipe coupling structure before pipes are coupled according to a second embodiment of the present invention. This embodiment is different from the first embodiment in the respect that the second pipe is a T-shaped pipe 3. Some component elements of the second embodiment are given the same reference characters and numerals as those of the first embodiment, as long as the former are identical to the latter. Thus, their description is omitted.

The T-shaped pipe 3 is made of metal, has a substantially T-shape and has three connection end portions (end parts) 3A-3C. The connection end portions 3A-3C each have the same formation, and the first connection end portion 3A and the second connection end portion 3B have the same outer diameter. The case where the first air-conditioning duct 1 is connected to the first connection end portion 3A will mainly be below described.

The first connection end portion 3A has an outer diameter slightly smaller than the inner diameter of the first air-conditioning duct 1 and is formed with a second engagement portion 31 and a contact portion 32, both of which extend in the circumferential directions (in the skew and vertical directions with respect to the axis) and protrude toward the outside thereof. The second engagement portion 31 has a formation (a sectional shape, a size and the like) equivalent to the second engagement portions 23 of the first embodiment and extends over the full circumference of the first connection end portion 3A.

The contact portion 32 corresponds to the contact portion 2b of the first embodiment, is shaped out of the metal plate forming the T-shaped pipe 3, protrudes outward in a convex shape (like a rib) and runs over the full circumference of the first connection end portion 3A. The contact portion 32 is formed and arranged so that when the first engagement portions 12 engage with the second engagement portion 31, the opening end 1a of the first air-conditioning duct 1 comes into contact with the contact portion 32. The thus-formed second engagement portion 31 and contact portion 32 are also formed in the second connection end portion 3B and the third connection end portion 3C.

In this embodiment, in order to couple/connect the first air-conditioning duct 1 and the T-shaped pipe 3, in the same way as the first embodiment, the first connection end portion 3A of the T-shaped pipe 3 is thrust into the one-end portion 1A of the first air-conditioning duct 1 to engage the first engagement portions 12 and the second engagement portion 31. As a result, the opening end 1a of the first air-conditioning duct 1 comes into contact with the contact portion 32, the one-end portion 1A of the first air-conditioning duct 1 is sandwiched between the second engagement portion 31 and the contact portion 32, and the first air-conditioning duct 1 is coupled to the T-shaped pipe 3. Then, sealing (an airtight process) is conducted in between the opening end 1a of the first air-conditioning duct 1 and the contact portion 32.

As described above, according to this embodiment, in the same way as the first embodiment, the first air-conditioning duct 1 is coupled to the T-shaped pipe 3 without driving a screw and using a tool. This lightens the burden on a worker, improves the safety of the worker and ensures appropriate execution of works.

Although the embodiments of the present invention have been above described, the present invention is not limited to the embodiments as specific configurations thereof. Without departing from the scope of the present invention, variations and the like in design should be included in the present invention. For example, in the above embodiments, the description is given of the coupling of the air-conditioning ducts 1 and 2 and the coupling of the first air-conditioning duct 1 and the T-shaped pipe 3. However, the first air-conditioning duct 1 may be coupled to an L-shaped elbow pipe, or alternatively, the first air-conditioning duct 1 may be coupled to a reducer pipe (gradually diameter-shrinking pipe). Further, the one-end portion 1A of the first air-conditioning duct 1 is formed with the plurality of interspersed first engagement portions 12, but it may be formed with a single first engagement portion 12 running over the full circumstance.

Moreover, the insertion of the second pipe into the first pipe may be conducted in the opposite direction. For example, in the second embodiment, the first air-conditioning duct 1 is the first pipe and the T-shaped pipe 3 is the second pipe, and the first connection end portion 3A of the T-shaped pipe 3 is inserted into the one-end portion 1A of the first air-conditioning duct 1. In contrast, the first air-conditioning duct 1 may be the second pipe and the T-shaped pipe 3 may be the first pipe. In that configuration, the one-end portion 1A of the first air-conditioning duct 1 is inserted into the first connection end portion 3A of the T-shaped pipe 3. In this case, the one-end portion 1A of the first air-conditioning duct 1 is formed with the second engagement portion protruding outside thereof and the first connection end portion 3A of the T-shaped pipe 3 is formed with the first engagement portion protruding inside thereof. In short, the pipe the one-end portion of which is located outside of the other pipe corresponds to the first pipe, and the pipe the one-end portion of which is located inside of the other pipe corresponds to the second pipe.

Furthermore, in the above embodiments, the first air-conditioning duct 1 is formed with the first engagement portions 12 arranged only in an end part thereof. However, the first engagement portions 12 may be formed in both end parts thereof. Similarly, the second air-conditioning duct 2 may be formed with the second engagement portions 23 arranged in both end parts thereof. Further, the first air-conditioning duct 1 may be formed with the first engagement portions 12 arranged in one end part thereof and with the second engagement portions 23 arranged in the other end part thereof. In other words, a single pipe may be: the first pipe formed with the first engagement portions arranged in one end part thereof; and at the same time, the second pipe formed with the second engagement portions arranged in the other end part thereof. Variations like this also apply similarly to the T-shaped pipe 3 and the like which have three or more end parts.

INDUSTRIAL APPLICABILITY

The present invention is not limited to an air-conditioning duct, and hence, is also applicable to other types of pipes such as an exhaust pipe and a drainpipe. Further, the present invention is also applicable to pipes other than a spiral pipe.

DESCRIPTION OF THE SYMBOLS 1 first air-conditioning duct (first pipe)
11 seam portion
12 first engagement portion
1A one-end portion (end part)
1a opening end
2 second air-conditioning duct (second pipe)
21 seam portion
22 grooved concave portion
23 second engagement portion
2A one-end portion (end part)
2a opening end
2b contact portion
3 T-shaped pipe (second pipe)
31 second engagement portion
32 contact portion
3A-3C connection end portions (one-end portions)

The invention claimed is:

1. A pipe coupling structure, comprising:
a first engagement portion formed in an end part of a first pipe, the first engagement portion extending in the circumferential directions of the first pipe and protruding inside of the first pipe, the first engagement portion having a curved lead-in portion and a vertical portion;
a second engagement portion formed in an end part of a second pipe, the second engagement portion extending in the circumferential directions of the second pipe and protruding outside of the second pipe, the second engagement portion having a curved lead-in portion and a vertical portion, the end part of the second pipe being insertable into the end part of the first pipe,
wherein the end part of the second pipe is inserted into the end part of the first pipe, the curved lead-in portion of the second engagement portion climbs over the curved lead-in portion of the first engagement portion, and thereby, the first engagement portion and the second engagement portion engage each other via the respective vertical portions of the second engagement portion and the first engagement portion,
wherein the end part of the second pipe has an outer diameter smaller than the second pipe and is formed with a plurality of grooved concave portions running in the axial directions of the second pipe, and the second engagement portion is arranged between the grooved concave portions.

2. The pipe coupling structure according to claim 1, wherein the first engagement portion is shaped out of a single belt-like metal plate forming the first pipe and the second engagement portion is shaped out of a single belt-like metal plate forming the second pipe, in order to increase the strength of the coupling structure.

3. The pipe coupling structure according to claim 1, wherein the end part of the second pipe is slidably inserted into the end part of the first pipe, the second engagement portion climbs over the first engagement portion, and thereby, the first engagement portion and the second engagement portion engage each other.

4. The pipe coupling structure according to claim 1, wherein the second pipe is formed with a contact portion coming into contact with the opening end of the first pipe when the first engagement portion and the second engagement portion engage each other.

5. A coupling structure for first and second cylindrically shaped air conducting duct bodies, each of the cylindrically shaped duct bodies having an inner and outer cylindrical wall surface, the coupling structure comprising:
a first duct engagement portion extending outwardly from the outer wall surface of the first duct body, wherein the first duct engagement portion has a cross-sectional shape that includes:
a first wall portion extending from a first wall portion first end in a direction approximately perpendicular to the outer wall surface; and
a second curved wall section extending from the outer wall surface to a first wall portion second end; and
a second duct engagement portion extending inwardly from the inner wall surface of the second duct body, wherein the second duct engagement portion has a cross-sectional shape that includes:
a third wall portion extending from a third wall portion first end in a direction approximately perpendicular to the inner wall surface; and
a fourth curved wall section extending from the inner wall surface to a third wall portion second end,
wherein the first duct engagement portion extends about the entire circumference of the outer cylindrical wall surface of the first duct body.

6. The coupling structure of claim 5, wherein the first duct body has a smaller cylindrical diameter than the diameter of the second duct body.

7. The coupling structure of claim 6, wherein the first duct body is slidably engageable within the second duct body.

8. The coupling structure of claim 7, wherein the second duct body has a second duct body end, the coupling structure further comprising:
a third duct engagement portion extending outwardly from the outer wall surface of the first duct body, wherein the third duct engagement portion abuts the second duct body end when the first duct body is slidably engaged with the second duct body.

9. A coupling structure for first and second cylindrically shaped air conducting duct bodies, each of the cylindrically shaped duct bodies having an inner and outer cylindrical wall surface, the coupling structure comprising:
a first duct engagement portion extending outwardly from the outer wall surface of the first duct body, wherein the first duct engagement portion has a cross-sectional shape that includes:
a first wall portion extending from a first wall portion first end in a direction approximately perpendicular to the outer wall surface; and
a second curved wall section extending from the outer wall surface to a first wall portion second end; and
a second duct engagement portion extending inwardly from the inner wall surface of the second duct body, wherein the second duct engagement portion has a cross-sectional shape that includes:
a third wall portion extending from a third wall portion first end in a direction approximately perpendicular to the inner wall surface; and
a fourth curved wall section extending from the inner wall surface to a third wall portion second end, wherein the second duct body comprises a spirally-wrapped strip.

10. The coupling structure of claim 9, wherein the spirally-wrapped strip has a pair of opposing edges, each of the spirally wrapped strip edges abuttably attaching an opposing edge to form a ridge extending from the outer surface of the second duct body.

11. A coupling structure for first and second cylindrically shaped air conducting duct bodies, each of the cylindrically shaped duct bodies having an inner and outer cylindrical wall surface, the coupling structure comprising:
- a first duct engagement portion extending outwardly from the outer wall surface of the first duct body, wherein the first duct engagement portion has a cross-sectional shape that includes:
  - a first wall portion extending from a first wall portion first end in a direction approximately perpendicular to the outer wall surface; and
  - a second curved wall section extending from the outer wall surface to a first wall portion second end; and
- a second duct engagement portion extending inwardly from the inner wall surface of the second duct body, wherein the second duct engagement portion has a cross-sectional shape that includes:
  - a third wall portion extending from a third wall portion first end in a direction approximately perpendicular to the inner wall surface; and
- a fourth curved wall section extending from the inner wall surface to a third wall portion second end, wherein the outer wall surface of the first duct body has no communicating opening to the inside of the first duct body.

* * * * *